Figure 1:
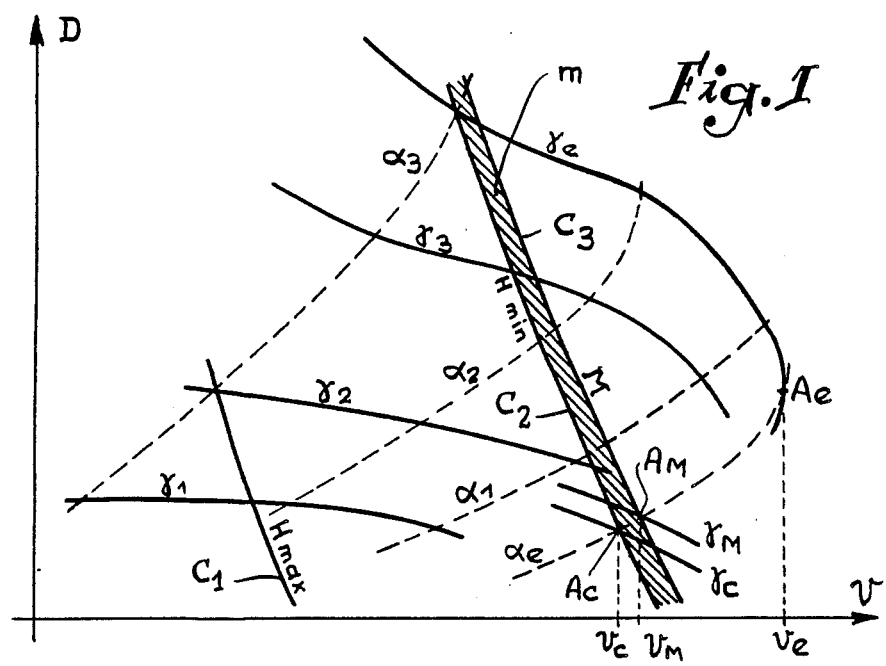

United States Patent [19]

Megnint et al.

[11] Patent Number: 4,743,160
[45] Date of Patent: May 10, 1988

[54] PROCESS AND DEVICE FOR LIMITING THE OVERSPEED OF A LOW HEAD HYDROELECTRIC GENERATING SET

[76] Inventors: Lucien Megnint, 46 Boulevard Foch; Paul Jarriand, 117 Cours Jean-Jaurès, both of FR 38000 Grenoble, France

[21] Appl. No.: 774,697

[22] Filed: Sep. 11, 1985

[30] Foreign Application Priority Data

Sep. 18, 1984 [FR] France .................. 84 14259

[51] Int. Cl.⁴ ............................. F04D 15/00
[52] U.S. Cl. ...................... 415/33; 415/43
[58] Field of Search .............. 415/16, 27, 30, 33, 415/36, 42, 43, 44, 129, 130, 160, 163

[56] References Cited

U.S. PATENT DOCUMENTS

| | | | |
|---|---|---|---|
| 1,901,771 | 3/1933 | Pfau | 415/33 |
| 1,901,776 | 3/1933 | Ring | 415/33 |
| 2,115,890 | 5/1938 | Thoma | 415/33 |
| 2,227,417 | 12/1940 | Ring et al. | 415/33 |
| 2,283,127 | 5/1942 | Rheingans | 415/33 |
| 2,866,470 | 12/1958 | Hold et al. | 415/16 |
| 2,926,680 | 3/1960 | Eggenberger | 415/16 |
| 3,069,136 | 12/1962 | Thuss | 415/33 |
| 3,118,281 | 1/1964 | Gros | 415/130 |
| 3,130,955 | 4/1964 | Sproule | 415/129 |
| 3,229,958 | 1/1966 | Borel | 415/33 |
| 3,342,194 | 9/1967 | Dwight | 415/16 |

FOREIGN PATENT DOCUMENTS

| | | | |
|---|---|---|---|
| 545942 | 10/1922 | France | 415/16 |
| 65591 | 4/1984 | Japan | 415/16 |

Primary Examiner—Robert E. Garrett
Assistant Examiner—John T. Kwon
Attorney, Agent, or Firm—Dowell & Dowell

[57] ABSTRACT

A process and apparatus for preventing the overspeed of a low head hydroelectric generating set including a turbine having an adjustable distributor valve assembly and adjustable vanes wherein the openings of the valve assembly and vanes are continuously monitored relative to one another and with the openings of the valve being limited by a conjugation device so as to insure that the pressure head through the turbine is retained at or just slightly below the normal lowest operating pressure head for which the turbine is designed to operate.

4 Claims, 2 Drawing Sheets

PROCESS AND DEVICE FOR LIMITING THE OVERSPEED OF A LOW HEAD HYDROELECTRIC GENERATING SET

The present invention relates to a process for limiting the overspeed of a low head hydroelectric generating set with adjustable distributor valve and adjustable wheel vanes, such as a bulb generating set with mobile distributor and with mobile vanes, adapted to operate under a pressure head adapted to vary in normal operation between, for example, 8 and 16 meters.

A low-head hydroelectric generating set, such as a bulb generating set, generally comprises a turbine-alternator assembly, the hydraulic flow being axial. In normal operation, the set delivers to the electric network and rotates at its speed of synchronism. On the other hand, in the event of a mishap, in the case of opening of the main circuit breaker, for example, the moment of resistance disappears with the result that, the driving torque still being applied on the machine, the set begins to race.

The overspeeds of the bulb generating sets are generally high and may be three times higher than their speed of synchronism, and even more. The mechanical efforts on the rotating parts being proportional to the square of the speed, said efforts are therefore multiplied, at overspeed, by a factor which may attain 10, and even more. Any overspeed is therefore dangerous whatever the turbines and alternators used.

The bulb generating sets intended for high output, very low head installations comprise wheels with adjustable vanes of large diameter rotating at low speed. Recent studies have shown that, for very low speeds of rotation of the turbine, less than 70 revolutions per minute for example, it becomes economically advantageous to adapt a high-speed alternator driven by a coaxial multiplier. This arrangement may allow a substantial reduction of the bulb diameter constituted by the enclosure containing the alternator and the multiplier. In order to benefit from this possibility to a maximum, it often appears necessary to seek the highest speed of rotation possible for the alternator, in order to raise the speed-increasing ratio beyond about 8.5, this allowing the choice of a two-stage multiplier of reduced dimensions. The overspeeds of the bulb generating sets, which are generally high, constitute an important handicap for constructors who encounter considerable difficulties in producing the high-speed alternators, and even impossibilities of production when the ratio of the maximum overspeed to the nominal speed exceeds 3. It therefore appears indispensable to develop a reliable device limiting the ratio of overspeed to values less than 3.

The invention therefore relates to a process for limiting the overspeed of a low head hydroelectric generating set, such as an axial set of the bulb type for example, comprising a hydraulic turbine with adjustable distributor valve and adjustable wheel vanes, characterized in that it consists in limiting the opening of the distributor or valve assembly for each opening of the vanes in accordance with a law or line of limitation, that is, the necessary respective openings of the valve assembly and the vanes at a limiting head pressure which is just lower than the minimum recommended operating pressure and which openings may be determined by reference to a particular point along a conjugation line which defines the normal operating ratio between the openings of the distributor and of the vanes of the turbine at a given constant pressure. The lines of conjugation reflect the openings of the valve assembly for each opening of the vanes at a given constant head pressure.

The law or line of limitation which defines the necessary respective openings between the valve assembly and the vanes at a predetermined limiting head pressure is selected at some percent in relative values below that corresponding to the minimum pressure head.

The invention also relates to a device for carrying out the process defined hereinabove, characterized in that it comprises a limiter limiting opening of the distributor or value assemblies for every opening of the vanes. The members for opening the distributor and for opening the vanes in said limiter being coupled by a conjugation device which effectively limits the openings of the valve assemblies for a specific opening of the vanes so that the pressure level does not fall below the limiting pressure as defined as the law or lines of limitation.

The invention will be more readily understood on reading the following description with reference to the accompanying drawings, in which:

FIG. 1 is a diagram comprising a set of contour lines corresponding to the gradient of overspeed of the turbine, as well as the laws or lines of conjugation thereof and the law or lines of limitation of the invention.

Figure 2:
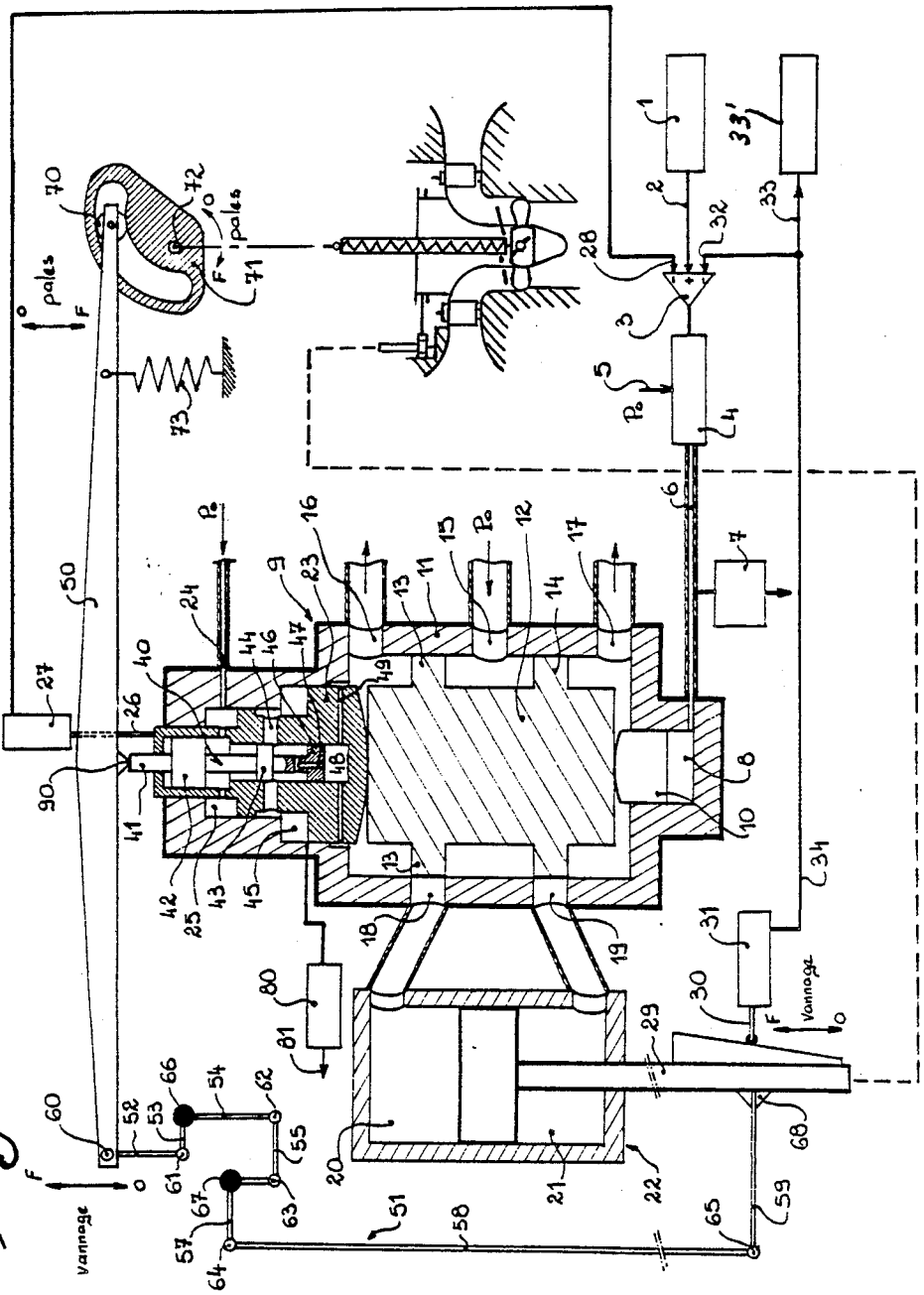

FIG. 2 schematically shows a device for carrying out the process for limiting overspeed according to the invention.

Figure 3:
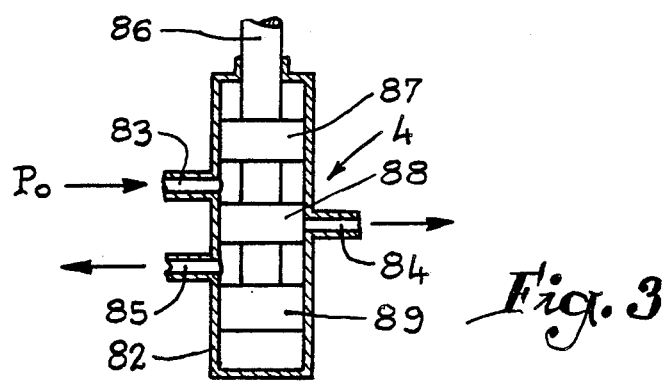

FIG. 3 is a diagram of the actuator with which the device of FIG. 2 is equipped.

Referring now to the drawings, and firstly to FIG. 1, every manufacturer generally provides, for a given hydraulic turbine, a topographic chart of the lines of equal yield, called "gradient of yield" by analogy with the isohypses of a hill on a topographic map. These lines are plotted in reduced coordinates giving the output in the turbomachine reduced to a wheel with a diameter of one metre under one meter of pressure head as a function of its speed of rotation likewise reduced to a wheel with a diameter of one meter under one metre of pressure head.

Furthermore, for the machine to operate with optimum efficiency, it is necessary that the openings of vanes and distributor be optimum for a given point of operation. The manufacturer therefore provides, for a given machine, a network of "conjugation" lines between the angles of opening of the vanes and of the distributor for the different outputs and the different pressure heads for which the machine normally operates. A given opening of the vanes is therefore always associated with a certain value of the opening of the distributor, also referred to as valve assembly, by the law or line of conjugation deduced from this set of lines. A conjugation device, either mechanical in the past with a conjugation cam, or generally electronic at the present time, ensures this condition in normal operation. In the event of a mishap involving inter alia overspeed of the machine, such conjugation is no longer ensured, with the result that the vanes and valve assembly take any values of opening, which may correspond to high overspeeds.

From the gradient of yield of the machine and its conjugation lines, the set of lines of FIG. 1 may be deduced, which will be referred to hereinafter as "gradient of overspeed", and which comprises, with the water flowrate D on the y-axis and the speed of rotation v on the x-axis:

lines $\gamma_1, \gamma_2, \gamma_3, \ldots, \gamma_e$ corresponding to different openings of the valve assembly (distributor), lines $\alpha_1, \alpha_2, \alpha_3, \ldots, \alpha_e$ corresponding to different openings of the vanes, lines $C_1, \ldots, C_2$ of conjugation between the valve assembly and the vanes in normal operation of the machine for different pressure heads, line $C_1$ being the conjugation lines for maximum pressure head Hmax, the example 16 meters, and line $C_2$ being the conjugation line for minimum pressure head Hmin, for example 8 meters.

On the gradient of overspeed of FIG. 1, line $\alpha_3$ corresponds to the maximum angle of opening of the vanes, and the other lines $\alpha_2, \alpha_1, \alpha_e$ correspond to openings less than this maximum and progressively decreasing from $\alpha_3$. Similarly, line $\gamma_e$ corresponds to the maximum opening possible of the valve assembly, whilst the other lines $\gamma_3, \gamma_2, \gamma_1$ correspond to openings less than this maximum and progressively decreasing with respect to $\gamma_e$. Finally, on the graph, the lines of conjugation $C_1, \ldots, C_2$ are more and more "high", i.e. more and more to the right, as shown on the graph, with respect to $C_1$ as the pressure head H decreases.

In normal operation, the working point moves, for a given pressure head H, over the corresponding line of conjugation C, as a function of the conjugated values $\alpha$, $\gamma$, of the openings of the vanes and valve assembly respectively.

If, in the event of mishap, the conjugation given by law or line C no longer functions, the valve assembly may attain the angle of maximum opening $\gamma_e$. If, in that case, the vanes are open by angle $\alpha_e$, the working point comes to $A_e$, at the intersection of the lines $\gamma_e$ and $\alpha_e$, with the result that the turbine rotates at overspeed $v_e$, considered as too high, and which the present invention proposes to limit to a value $v_M$ considered as acceptable by the rotating parts.

It will be noted that, in normal operation, i.e. in conjugation, and for the most unfavourable case, i.e. for minimum pressure head Hmin, the working point for said opening of vanes $\alpha_e$, which is, moreover, very small, lies at $A_c$, for a conjugated opening of the valve assembly $\gamma_c$, this corresponding for the turbine to the speed $v_c$ substantially lower than the maximum overspeed $v_e$.

The plotting of these lines by the inventors and examination thereof has led to the following remarks:

maximum overspeed is obtained for a largely open valve assembly and for hardly open vanes, if the machine were obliged to remain in conjugation whatever happens, the overspeed would be limited to the value $v_c$.

In accordance with the invention, the overspeed is limited by limiting the accidental deconjugation of the vanes and of the valve assembly by addition "under control" of a law of limitation M (line $C_3$) merged with a law of conjugation, deduced from the gradient of yield and the lines of conjugation of the machine, which would correspond to a hypothetical working of the machine in normal operation and under a pressure head H less, and preferably slightly less, than the minimum pressure head Hmin (line $C_2$). The line of limitation $C_3$ of the invention is therefore on the graph slightly "above" the line $C_2$, the hatched margin m between these two lines corresponding to a value of some percent in relative values, for example 5%, with respect to the data of line $C_2$.

In practice, this process amounts, on the one hand, to having members for opening the vanes and the valve assembly respectively so as to maintain the respective openings as optimally defined along a line of conjugation M(line $C_3$), and, on the other hand, to using the conjuction line to define limits of opening of the valve assembly when, for a given position of the vanes, such as $\alpha_e$, the valve assembly tends to want to open more than by a value $\gamma_M$, given by the law of limitation M and slightly greater than that $\gamma_c$ which corresponds to normal operation in conjugation under the minimum pressure head Hmin. In other words, in the case of deconjugation at overspeed, the invention amounts to preventing, the vanes being open by a given value which may be small ($\alpha_e$ for example), the valve assembly from opening more than by a certain determined value, close to a zone of operation considered as dangerous for the machine.

The graph shows that, with the invention, the working point at overspeed for opening vanes $\alpha_e$ comes to $A_M$, the valve assembly being open by $\gamma_M$, and not being able to open more, with the result that the machine rotates at speed $v_M$, very slightly more than speed $v_c$ in normal operation, and in any case substantially less than the overspeed $v_e$ defined hereinabove.

It will be noted that the margin m is necessary, otherwise any variation of the device in normal operation would be impossible. However, it must not be too large, otherwise the overspeed would be insufficiently limited.

FIG. 2 schematically shows a non-limiting practical embodiment of the process which has just been described with reference to FIG. 1.

In this Figure, reference 1 denotes the electronic unit for controlling operation of the hydroelectric generating set, furnishing at its output 2 a signal for controlling opening or closure of the valve assembly, which signal is applied positively to an analog adder 3.

The electrical signal at the output of the adder 3 is applied to an "actuator" 4, i.e. a transducer of electrical level into oil pressure level, shown in detail in FIG. 3, which receives on another input 5 a fixed oil pressure $P_0$, called regulation pressure, and furnishes in its output conduit 6 an oil pressure p modulated by its electrical input signal coming from the adder 3.

Reference 7 denotes a safety valve forming pressure limiter adjusted for a triggering pressure slightly higher than $P_0$, and whose role will be explained hereinafter.

The pressure p is applied, via conduit 6, to the lower chamber 8 of a relay-distributor 9 where it pushes upwardly a piston 10 constituting the lower pusher of the distributor 9. The chamber 8 has a defined transverse section of value S.

The distributor 9 comprises in conventional manner, in a casing 11:
- a central piston 12, called slide of the distributor, provided with shoulders 13, 14 as shown,
- a median input 15 receiving oil at constant pressure $P_0$, called regulation pressure,
- an upper evacuation output 16 and a lower evacuation output 17,
- a first oil pressure output 18 towards the upper chamber 20 of the double-acting jack 22 controlling the opening and closure of the valve assembly,
- a second oil pressure output 19 towards the lower chamber 21 of said jack 22,
- an upper pusher 23 tending to push the slide 12 downwardly under the action of the regulation oil pressure $P_0$ applied by the input 24 in a chamber 25 of transverse section equal to S/2; in conventional manner, the position of the pusher 23 is tested by the rod 26 of a variometer 27, i.e. an analog transducer of position signal into electrical signal, of which the output voltage is applied negatively at 28 to an input of the analog adder 3.

In conventional manner, the rod 29 of the jack 22 controls opening 0 (rod moving downwardly) and closure F (rod moving upwardly) of the valve assembly, and the position of this rod 29 is tested by the rod 30 of a second variometer 31 of which the electrical analog output signal at 34 is applied on the one hand negatively on an input 32 of the adder 3 and on the other hand at 33 towards the electronic conjugation device 33' between the angles of opening of the valve assembly and the vanes, such device being conventional. It will be noted that, in this conventional device design, it is the vanes which follow the valve assembly via their law or line of conjugation.

All that part of the device of FIG. 2 which has just been described is extremely conventional, and it operates as follows:

In the position shown in the drawing, no signal for variation of position of the valve assembly is applied at 2 by the control unit 1, with the result that the distributor 9 is balanced, as shown. To this end, the actuator 4 is adjusted to furnish a pressure equal to $P_0/2$ in the conduit. The upward thrust force which is exerted on the pusher 10 is equal to $P_0/2 \times S$ and it therefore exactly balances that exerted downwardly on the pusher 23 which is equal to $P_0 \times S/2$.

If unit 1 now applies at 2 a voltage intended to modify the position of the valve assembly, for example a positive voltage $+V$, the actuator 4 immediately applies in the chamber 8 a pressure higher than $P_0/2$, function of V, for example $3P_0/4$.

Piston 10 then moves very quickly upwardly, taking along in its movement the slide 12 and the upper pusher 23. The variometer 27 then applies at 28 a voltage subtracted from V, which stops the rise of the assembly when this voltage becomes equal to V in absolute value. Simultaneously, shoulders 13 and 14 having revealed orifices 18 and 19, the upper chamber 20 of the jack 22 is supplied with oil pressure coming from input 15, whilst the lower chamber 21 of this jack is connected to evacuation via orifice 19 and output 17. The rod 29 of jack 22 therefore moves downwardly, bringing about opening of the valve assembly, whilst the variometer 31 furnishes at 34 a progressively increasing electrical voltage applied in subtraction at 32 on the adder 3. The same signal is applied at 33 towards the valve assembly/vanes conjugation device.

The slide 12 then returns progressively into its position of balance shown, the voltage at 28 decreasing progressively in absolute value from $+V$ to 0, whilst that at 32 increases progressively in absolute value from 0 to $+V$, and the system is again ready to receive a subsequent order coming from the control unit 1.

In order to enable the invention to be carried out, the conventional device which has just been described further comprises the following elements:

The upper pusher 23 is equipped, in its central part, with a slide 40, fairly similar to slide 12, comprising an axial rod 41 projecting beyond the upper level of the casing of the pusher 23, an upper oil retaining shoulder 42, a median shoulder 43 making it possible, if it is sufficiently driven in, to reveal lateral channels 44 leading to a pressure chamber 45 of transverse section S, and finally a lower shoulder 46 pierced with channels 47 allowing evacuation via a chamber 48, channels 49 and the output 16. Furthermore, a pressure regulator 80 measures the oil pressure in the chamber 45.

A floating lever 50 is positioned on the top of the rod 41 and its point 90 comes either into contact with the latter, or in position slightly thereabove. One of the ends of the lever 50, located to the left in the Figure, is connected by a linkage 51 comprising eight connecting rods (52 to 59), six hinge pins (60 to 65), two pins 66, 67 for rotation, and a fixed point 68 for anchoring to the valve assembly control rod 29 so as to impart to said end 60 the same upward movement 0, F, and vice versa, as that of rod 29. The other end of the floating lever 50 is equipped with a caster 70 which can move only in a cam 71 reproducing the law M of limitation of the invention, the cam 71 being itself driven in rotation about a pin 72 connected to the device which controls opening and closure of the vanes. A spring 73 makes it possible to return the lever 50 downwardly. When the cam rotates in one direction or in the other depending on whether the vanes open or close, the axis of the caster 70 rises or descends, as indicated by the arrows in the Figure, whilst the two ends of the lever are coupled in position in accordance with the law M imposed by cam 71.

The limitation device of FIG. 2 operates as follows:

As long as the machine is suitably conjugated, the floating lever 50 does not abut on the rod 41, with the result that the device operates in conventional manner as described hereinabove. If, on the other hand, for a given opening of the vanes, the valve assembly begins to open by a quantity greater than that given by the law or line of conjugation Hmin (line $C_2$ of FIG. 1), the lever 50 begins to drive in the slide 40. Nothing occurs as long as the shoulder 43 does not reveal the channel 44, the corresponding curve of this shoulder reproducing the margin m of some percent of FIG. 1.

When, the margin m then being consumed, the valve assembly opens more than allowed by the law or line of limitation M, reproduced by cam 71, the slide 40 has sufficiently driven in to reveal channel 44, with the result that the pressure $P_0$ at 24 is then also applied to chamber 45, of section S. The downward thrust force exerted on the upper pusher 23 then becomes equal to $P_0 \times 3S/2$, and therefore in any case becomes greater than that exerted upwardly by the lower pusher 10, which cannot exceed the value $P_0 \times S$. The slide 12 therefore returns downwardly, preventing any increase in opening of the valve assembly. The pressure regulator 80 displays on its output an alarm voltage, whilst the safety valve 7 avoids a dangerous overpressure in conduit 6.

In fact, concerning this latter point, reference will be made to FIG. 3 which recalls the conventional constitution of an actuator such as 4. The latter comprises a tight casing 82, an oil input 83 receiving pressure $P_0$, an evacuation output 85, an oil output 84, connected in the present example to conduit 6, and a slide 86, controlled in position by the electrical analog signal at the output of the adder 3, and comprising three distribution shoulders 87, 88, 89. For the central shoulder 88, there exist positions for which the output channel 84 is obturated, for example as shown in the drawing. If, with the device of the invention, the piston 10 is violently pushed downwardly by action of the lever 50, the pressure in chamber 8 and therefore in conduit 6 may rise to dangerous values. The safety valve 7 then triggers, avoiding an overpressure in the conduit 6.

Finally, it will be noted that the device (50, 40, 23, 71) for carrying out the invention is an entirely mechanical device, employing only devices with cam, lever arm, pistons and oil pressures. The device of the invention may therefore act even in the event of an electrical breakdown of the installation.

What is claimed is:

1. A process for limiting the overspeed operation of a low head hydroelectric generating set of the type which includes a hydraulic turbine with adjustable distribution valves and adjustable wheel vanes, comprising the steps of:
    (a) normally adjusting the valves for each adjustment of the vanes so as to maintain the valves and vanes in a relative predetermined optimal adjustment at given pressure heads, and
    (b) limiting the adjustment of the valves for each adjustment of the vanes when the pressure head through the turbine reaches a predetermined pressure head which is slightly below the normal minimum operating pressure head within a range of adjustments defined between a limitation conjugation line which defines the optimum adjustments of the vanes and valves at said predetermined pressure head and the conjugation line which defines the optimum adjustments of the vanes and the valves at the normal minimal operating pressure head through the turbine wherein the pressure head at which the limitation conjugation line is taken is within about 5% of the normal minimal operating pressure head.

2. The process of claim 1 wherein the opening adjustment of the valves is mechanically limited so as not to exceed an adjustment defined by said limitation conjugation line.

3. An apparatus for controlling the operating velocity of a hydroelectric turbine having adjustable distribution valves and wheel vanes so that the velocity is maintained at a rate below an overspeed rate which could cause damage to the turbine comprising, a valve control assembly having a control rod and a conjugation means for controlling the wheel vanes, a primary control means for applying a first pressure input for controlling operation of the turbine, pressure distribution means operatively connected between said primary control means and said valve control assembly, said pressure distribution means having a slide means which is movably responsive to said first pressure input, a second pressure input means connected to said pressure distribution means and being operatively connected to said valve control assembly in response to the movement of said slide means, a pusher means mounted in opposing relationship to said slide means, pressure regulation input means for introducing pressure to said pusher means to oppose the movement of said slide means, a first sensor means for monitoring the movement of said pusher means so as to supply a first return input into said primary control means, a second sensor means for monitoring said valve control assembly so as to supply a second return input into said primary control means, said second return input also being connected to said conjugation means for controlling the wheel vanes, a valve adjustment limitation assembly, said limitation assembly including an adjustable stop means having first and second ends which are vertically adjustable with respect to one another, linkage means connecting said control rod of said control valve assembly to said first end of said stop means so as to raise and lower said first end in response to movement of said control rod, a second mechanical conjugation means including means for selectively supporting said second end of said stop means in a controlled but movable relationship therewith, said second conjugation means being responsive to adjustments to the wheel vanes, piston means carried by said pusher means and being engageable by said stop means as said stop means is moved in a response to said linkage means and said second conjugation means, said piston means being movable by said stop means from a first position to a second position wherein the pressure from said pressure regulation input means is increased to thereby control the movement of said slide means.

4. The apparatus of claim 3 in which said second conjugation means includes a cam track which is movably connected to reflect adjustment to the wheel vanes, said stop means including a floating lever having one end movably supported in said cam track so that said lever is controlled in its movement by its position along said cam track, said cam tract being shaped so that said stop means will impact against said piston means when the relative adjustment of the wheel vanes and valves is such that the head pressure through the turbine falls slightly below a normal minimal head pressure.

* * * * *